United States Patent [19]

Sato

[11] Patent Number: 5,603,770

[45] Date of Patent: Feb. 18, 1997

[54] COATING DEVICE

[75] Inventor: Shogo Sato, Miyagi, Japan

[73] Assignee: Sony Corporation, Tokyo, Japan

[21] Appl. No.: 421,782

[22] Filed: Apr. 14, 1995

[30]    Foreign Application Priority Data

Apr. 15, 1994  [JP]  Japan .................................. 6-077539

[51] Int. Cl.$^6$ ........................................................ B05C 5/02
[52] U.S. Cl. ........................................... 118/623; 118/621
[58] Field of Search .................................. 118/410, 623,
    118/621, 620; 427/457, 472, 127, 128;
    346/74.2; 430/129; 156/244.11

[56]                References Cited

U.S. PATENT DOCUMENTS

| 4,424,762 | 1/1984  | Tanaka et al. ......................... 118/410 |
| 4,480,583 | 11/1984 | Tanaka et al. . |
| 4,681,062 | 7/1987  | Shibata et al. . |
| 5,085,168 | 2/1992  | Sollinger ................................. 118/623 |

FOREIGN PATENT DOCUMENTS

| 60-238179 | 11/1985 | Japan . |
| 62-95170  | 5/1987  | Japan . |
| 4-214229  | 8/1992  | Japan . |

*Primary Examiner*—Donald E. Czaja
*Assistant Examiner*—Calvin Padgett
*Attorney, Agent, or Firm*—Hill, Steadman & Simpson

[57]            ABSTRACT

An extrusion coating device has a die fitted with a paint sink fed with a paint, a slit extending from the paint sink to the distal end of the die, and a smoothing plate provided in the vicinity of the distal end of the die. The paint is extruded onto a continuously travelling support so as to be coated on the support. The smoothing plate is formed of a magnetic material and is magnetized to an opposite polarity to that of a magnet disposed via a gap of a pre-set length from the smoothing plate. The support is caused to travel along the end face of the smoothing plate so that the paint is coated on the support. The coating device enables a good coating film of a reduced film thickness to be produced while enabling high speed coating.

4 Claims, 3 Drawing Sheets

COATING DEVICE

BACKGROUND OF THE INVENTION

This invention relates to a so-called extrusion coating device. More particularly, it relates to a coating device conveniently employed for coating magnetic paint for fabrication of a magnetic recording medium.

For an audio tape or a video tape, a so-called coated magnetic recording medium is employed, in which a magnetic layer is formed by coating a magnetic paint, produced on dispersing and kneading magnetic powders, binder, dispersant or lubricant in an organic solvent, on a non-magnetic support, such as a polyester film.

For producing the coated type magnetic recording medium, an extrusion system employing an extrusion die coating device for applying a magnetic paint on a non-magnetic support is attracting attention and put to practical use, although on a limited scale.

The extrusion coating device has a die having a slit of a larger width facing its forward end face and having its forward end portion formed as a doctor edge. The coating device is so designed that the magnetic paint continuously extruded onto the surface of a running non-magnetic support is applied by the doctor edge on the non-magnetic support to a uniform thickness. With the extrusion coating device, the paint is supplied from both sides of the die into a sink of the coating liquid provided on the back surface of the slit. The paint is supplied via the sink of the coating liquid into the slit and extruded via the forward end of the slit so as to be coated on the non-magnetic support.

Such extrusion coating device lends itself to reduction of size and production cost since it is readily capable of forming a coating film of a uniform thickness, and is not fitted with a roll of a larger diameter. In addition, the paint supplied into the die is applied in its entirety and need not be circulated about the die, so that it is employed in the field of photographic films or photographic papers.

Recently, in the coating type magnetic recording medium, a coating technique capable of sufficiently coping with the high-speed coating and reduction in thickness of the coating film for improving productivity has been desired.

To this end, the coating methods such as those shown in U.S. Pat. Nos. 4,424,762 or 4,480,583 or JP Patent Kokai Publication 60-238179, have been proposed in connection with the above-described extrusion coating devices.

With the coating devices, it is difficult to cope with the demand for high-speed coating or reduction in thickness of the coating film, such that, if the film thickness of the coating film is not more than 30 μm in wet thickness, the produced coating film tends to have a fluctuating film thickness.

As a technique for overcoming such inconvenience, there has been proposed in, for example, JP Patent Kokai Publication 62-95170, a method in which a slit formed at the forward end of a die is thrust against the non-magnetic support, without supporting the back surface of the running non-magnetic support, and in which the paint is extruded via the slit by a permanent magnet of 50 to 5000 gauss on the opposite side of the slit in order to effect the coating.

However, the above method is not sufficient to respond to the demand for high-speed coating or reduction in thickness of the coating film. On the other hand, with the blade of a magnetic material, provided at the distal end of the die, the coating thickness along the width is marred in the produced coating film, such that an optimum coating film cannot be produced. In addition, a magnetic circuit is formed in which the magnetic flux of a permanent magnet is passed through the magnetic paint and returned back to the opposite pole of the magnet. Consequently, should the non-magnetic material be used as the blade material, the magnetic flux is scattered, although the effect proper to the magnet is derived. Thus the motion of the magnetic paint cannot be maintained during high-speed coating, such that coating cannot be performed with sufficient stability.

There is also proposed in, for example, the JP Patent Kokai Publication No. 4-214229 a method of employing an electro-magnet in place of a permanent magnet as blade magnetizing means.

However, since only the position of mounting the electro-magnet is defined with the present method by an angle the electro-magnet makes with the surface of a non-magnetic support, the above-mentioned inconvenience cannot be eliminated.

Thus it is not possible with the conventional coating device to achieve a sufficient effect in raising the coating speed and reducing the thickness of the coating film.

SUMMARY OF THE INVENTION

In view of the foregoing, it is an object of the present invention to provide a coating device in which the high coating speed and reduction in coating thickness may be achieved and an optimum coating film may be produced.

According to the present invention, there is provided an extrusion coating device having a die fitted with a paint sink fed with a paint, a slit extending from the paint sink to the distal end of the die, and a smoothing plate provided in the vicinity of the distal end of the die, in which paint is extruded onto a continuously travelling support for being coated thereon The smoothing plate is magnetized to a polarity opposite to the polarity of a magnet provided via a gap of a pre-set distance from the smoothing plate. The support has the paint coated thereon as the support travels along a distal end surface of the smoothing plate through a space between the magnet and the smoothing plate.

The extrusion coating device means such a coating device including an extrusion die having a slit exposed on a distal end face of the die and having a doctor edge formed in the vicinity of the distal end face of the die. The paint continuously extruded towards the surface of the continuously running support is applied by the doctor blade to a uniform thickness on the support.

According to the present invention, the smoothing plate provided in the vicinity of the end face of the die is formed of a magnetic material and is magnetized by a magnet provided facing the distal end face of the die with the support in-between. The support is caused to run on the magnetized smoothing plate. The polarity on the smoothing plate is opposite to that of the magnetic pole of the magnet facing the distal end face of the die. This causes the magnetic flux of the magnet to positively hold the motion of the paint supplied to the surface of the support to prevent the occurrence of the unusual paint behavior during high-speed coating and coating of a thin film.

It is desirable that the magnetic intensity on the smoothing plate be suitably selected depending on the coating speed and characteristics of the paint, such as viscosity or surface tension. Above all, for the magnetic intensity of the magnet of not less than 100 gauss and the magnetic intensity on the smoothing plate of 100 to 2000 gauss, the magnetic intensity on the smoothing plate is desirably 100 to 3000 gauss. If the magnetic intensity of the smoothing plate is less than 100 gauss, the desired sufficient effect cannot be achieved. Conversely, if the magnetic intensity of the smoothing plate exceeds 2000 gauss, the coating film is not optimum because of surface roughness.

For adjusting the magnetic intensity on the smoothing plate in this manner, it is desirable to change the distance between the magnet and the smoothing plate.

When supplying the paint to a support running continuously for forming a coating film thereon, the smoothing plate provided in the vicinity of the end face of the die is magnetized to an opposite polarity to that of a die-side magnetic pole of the magnet which is placed facing the end face of the die with the support in-between. This causes the magnetic flux of the magnet to be concentrated on the smoothing plate for effectively holding the paint supplied to the support running along the end face of the smoothing plate.

According to the present invention, the magnetic intensity acting on the paint may be adjusted by adjusting the distance between the smoothing plate and the magnet for coping with changes in the coating speed or characteristics of the paint, such as viscosity or surface tension.

DESCRIPTION OF THE PREFERRED EMBODIMENTS

Figure 1:
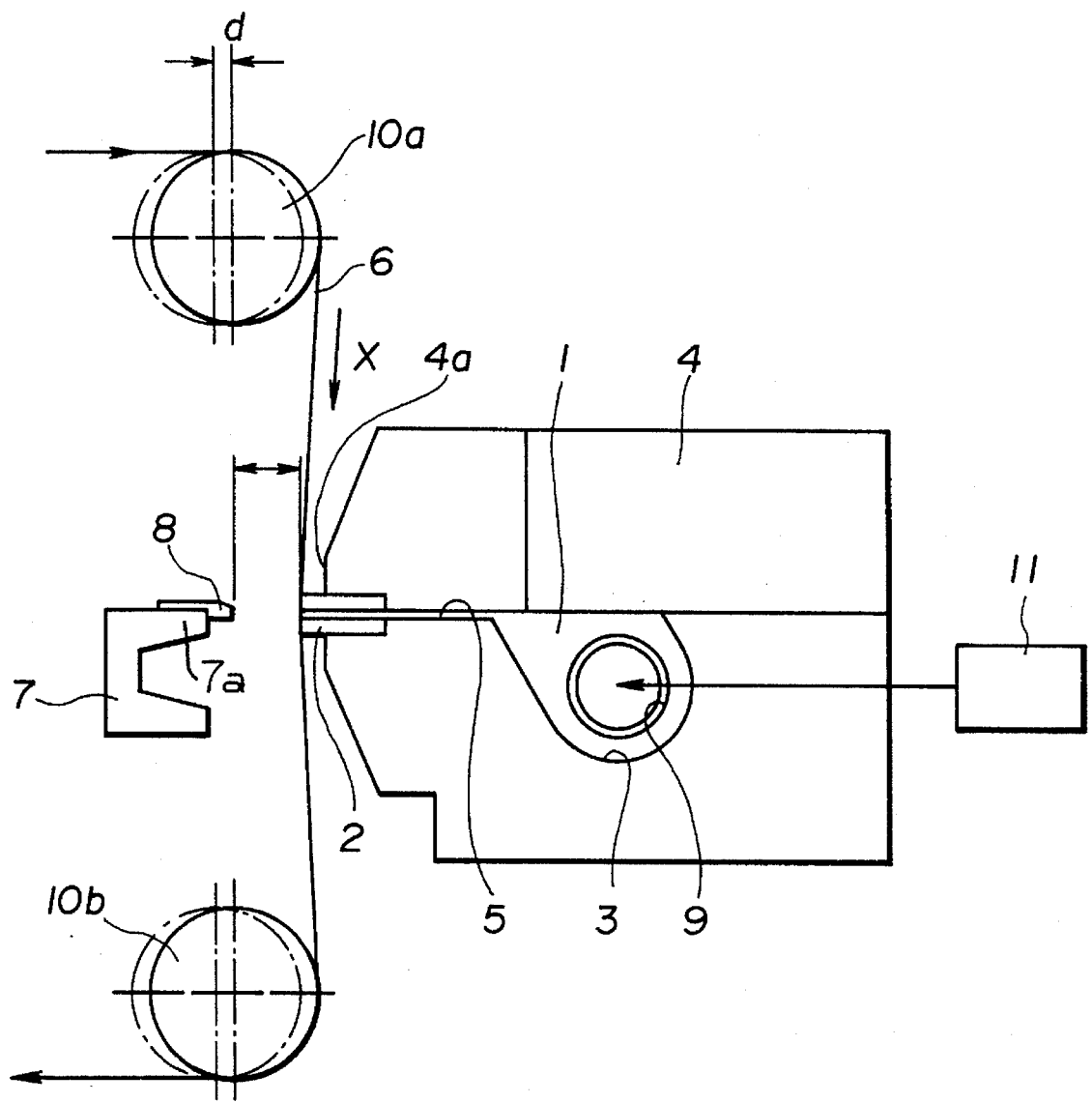
FIG. 1 schematically shows an arrangement of a coating device according to an embodiment of the present invention.

By referring to the drawings, preferred embodiments of the present invention will be explained in detail.

In the present embodiment, a magnetic layer is formed by coating a magnetic paint on a polyethylene terephthalate film, as a non-magnetic support, using a coating device in which a smoothing blade is magnetized by a magnet arranged via the non-magnetic support to a polarity opposite to that of the magnet.

The arrangement of the coating device employed for applying the magnetic paint to the non-magnetic support in the present embodiment is explained.

With the present coating device, an extruder die 4, in the form of a substantially cuboid metal block having a pre-set width, is arranged at a mid portion of the travel path of a non-magnetic support 6 from the reel-out side to the take-up side, as shown in FIG. 1.

The die 4 is fitted with a lip 2 for facing the surface of the non-magnetic support 6. The lip 2 is mounted on an end face 4a of the die 4 laterally of the non-magnetic support 6 travelling from the upper side towards the lower side in FIG. 1.

Figure 2:
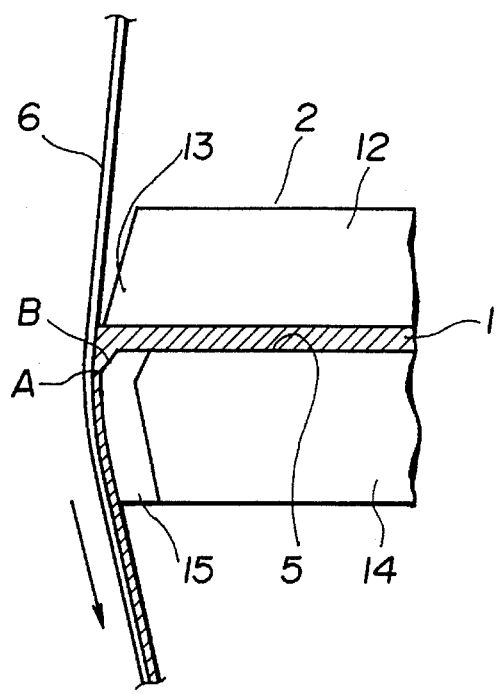
FIG. 2 schematically shows a construction of a lip of the coating device.

The lip 2 has its end face sliced obliquely to form a wedge and has a slit 5 opening at the end face with a width corresponding to the coating width, as shown in FIG. 2.

The slit 5 is a gap via which a paint 1 of a magnetic material is extruded and usually has an extremely narrow width on the order of 0.01 to 2.0 mm.

An end portion of an upper part of the lip 2 (upper lip 12), disposed on the upper side of the lip 2 with the slit 5 in-between, serves as a front blade 13 controlling the amount of coating of the paint 1 extruded via the slit 5 onto the non-magnetic support 6.

An end portion of a lower part of the lip 2 (lower lip 14) serves as a smoothing blade 15 for smoothing the surface of the paint 1 applied to the non-magnetic support 6.

On the distal end side of the smoothing blade 15, there is mounted a magnet 7 with a pre-set gap with respect to the smoothing blade 15, as shown in FIG. 1. The magnet 7 is substantially U-shaped and has its one end 7a fitted with a yoke 8.

The smoothing blade 15 is formed of a magnetic material and is magnetized by the magnet 7 to a polarity opposite to the polarity of the end 7a of the magnet 7. This concentrates the magnetic flux of the magnet 7 on the smoothing blade 15 for strongly constraining the paint 1 supplied on the non-magnetic support 6 travelling along the end face of the smoothing blade 15 for prohibiting the unusual behavior of the paint even when the paint is applied at a high speed and to a reduced thickness, thus producing an optimum coating film.

Figure 3:
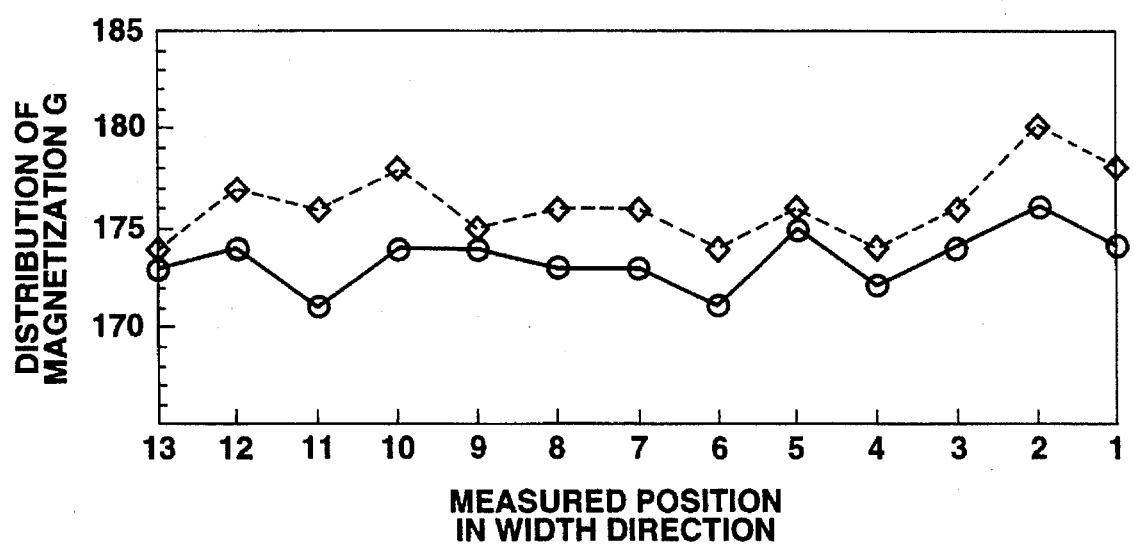
FIG. 3 is a graph showing the distribution of magnetization along the width of a smoothing blade formed in the vicinity of the forward end of the lip.

FIG. 3 shows the distribution of magnetization at positions A and B along the width of the magnetized smoothing plate 15. In FIG. 3, a solid line and a broken line denote amounts of magnetization at the positions A and B, respectively.

It is seen from FIG. 3 that the magnetic flux of the magnet 7 is concentrated on the smoothing blade 15.

On the rear side of the slit 5 is formed a pocket (sink for a coating solution) connecting to the slit 5, as shown in FIG. 1. The pocket 3 is formed as an orifice-shaped spacing having a length equal to the width of the slit 5.

On both ends of the pocket 3 are formed coating solution supply ports 9, which is open on both side faces of the die 4. The coating solution supply ports 9 are connected to coating solution supply conduits, not shown, for introducing the paint 1 into the pocket 3.

In a mid portion of the coating solution supply conduit is fitted a pump 11 by means of which the paint 1 is fed under pressure from the coating solution supply conduit into the pocket 3. Thus the pocket 3 is a space for receiving the paint 1 fed under pressure and thus plays the role of an accumulator. The paint 1 fed under pressure into the pocket 3 is supplied into the slit 5 and is extruded on the surface of the travelling non-magnetic support 6 from the distal end of the slit 5 so as to be formed into a coating film.

On the other hand, the non-magnetic support 6, travelling from the reel-out side towards the take-up side, is adapted for being supported by guide rolls 10a, 10b and placed under a suitable tension by the guide rolls 10a, 10b to assure smooth running.

Thus, with the coating device, the lip 2, mounted on the end face 4a of the extruder die 4, is caused to bear against the surface of the non-magnetic support 6, reeled out from the reel-out side and travelling in a direction shown by arrow X in FIG. 1. The paint 1 is extruded via the slit 5 exposed on the end surface of the lip 2 at the abutment surface for forming a coating film on the support surface.

Using the above-described coating device, a magnetic paint was applied on a polyethylene terephthalate film, 620 mm in width and 14.5 μm in thickness, to a dry film thickness of 3.1 μm, for fabricating a tape for a video tape recorder (VTR).

The coating conditions for the extruder die were the coating width of 610 mm, the front blade and smoothing blade material being cemented carbide, magnetization of the smoothing blade surface being 180 gauss, the lower lip being of the one-step design and 3 mm in length, a slit gap being 260 μm and a lip step difference being 57 μm.

The coating condition for the coating device includes a tension of 15.5 kg and the coating conditions for the magnet include the magnetic intensity of 2000 gauss for the case of a permanent magnet and a distance between the magnet and the smoothing blade being 12 mm.

In the above coating, the coating behavior was checked for variable distances d in FIG. 1 as an index for evaluating the high-speed coating performance. It has been found that, even with the coating speed of 500 m/min, which represents the maximum running speed of a test coating device, chipping or overflow could be controlled satisfactorily and the effective coating area reached a significantly high coating speed range, thus indicating that a superior high-speed coating performance could be achieved.

Figure 4:
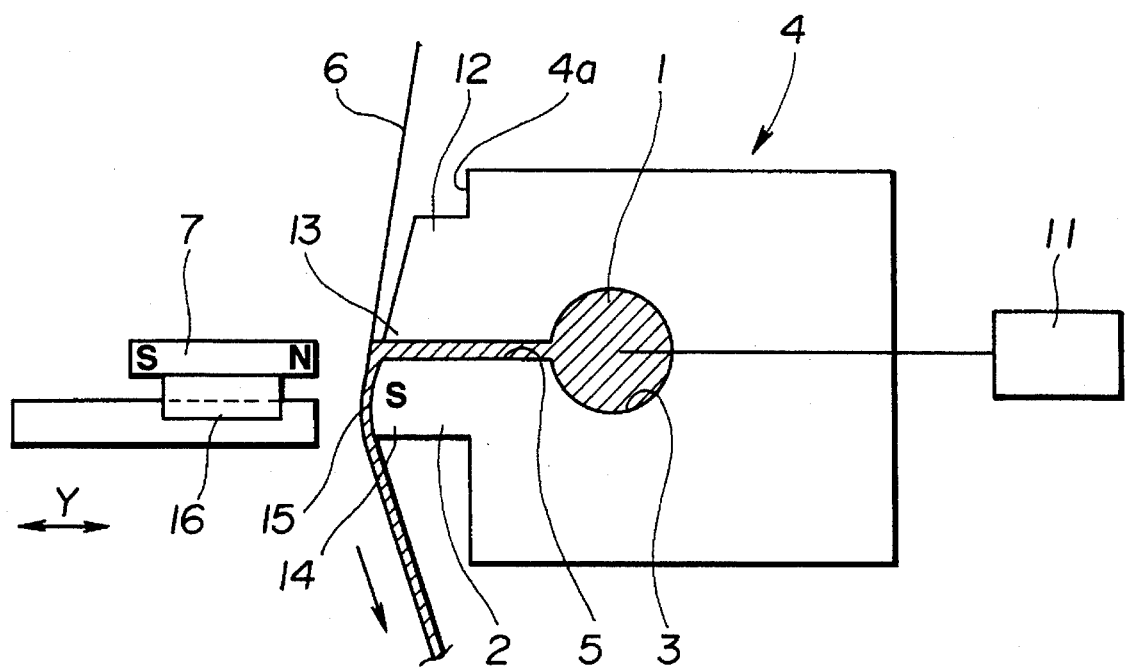
FIG. 4 schematically shows an arrangement of a coating device according to an embodiment of the present invention.

Then, as shown in FIG. 4, the magnet 7 was affixed to a gap adjustment device 16, which was movable as indicated by arrow Y in FIG. 4, and the state of the coating film was checked as the distance between the magnet 7 and the smoothing blade 15 was changed for changing the magnetic intensity on the smoothing blade 15. With the coating device shown in FIG. 4, the main components are used in common with the previous embodiment, so that the same components as those used in FIG. 1 are denoted by the same numerals and the corresponding description is omitted for clarity. The results are shown in the following Table 1.

TABLE 1

| Coating Speed (m/min) | Magnetic Intensity on Smoothing Plate (gauss) | | | | | | |
|---|---|---|---|---|---|---|---|
| | Demagnetized State | 50 | 100 | 200 | 300 | 400 | 500 |
| 100 | o | o | o | o | o | o | o |
| 200 | o | o | o | o | o | o | o |
| 300 | Δ | Δ | o | o | o | o | o |
| 400 | x | x | Δ | o | o | o | o |
| 500 | x | x | x | Δ | o | o | o |

The states of the coating films were evaluated in three stages. That is, in the following Table 1, O, Δ and x denote a good coating film, a coating film with streaks or the like and a coating film produced with considerable difficulties, respectively.

It is seen from Table 1 that, by changing the distance between the magnet and the smoothing plate for adjusting the magnetic intensity on the smoothing plate, a good coating film can be produced even although the coating speed was increased to 500 m/min. This is presumably ascribable to the fact that, by causing the magnetic flux to act on the magnetic paint, the magnetic paint is strongly constrained and prohibited from making an unusual behavior even if the coating speed is increased.

What is claimed is:

1. In an extrusion coating device for applying a coating on a continuous support, said device comprising a die having a paint sink fed with a paint, a slit extending from the paint sink to a distal end of the die, and a smoothing plate provided in the vicinity of the distal end of the die, means mounting a magnet opposite the slit of the die with a gap of a pre-set distance from the smoothing plate to aid in applying the paint on the support, and means for moving the continuous support along a path between the magnet and the smoothing plate of the die with the path having the support traveling along an end surface of the smoothing plate, the improvements comprising means for concentrating the magnetic flux on the smoothing plate to constrain the paint on the support traveling along the end face of the smoothing plate, said means having the smoothing plate being magnetized to a polarity opposite to the polarity of said magnet.

2. In a coating device according to claim 1, wherein the magnetic intensity of the smoothing plate is in a range of 100 to 3000 gauss and the magnetic intensity of the magnet is not less than 100 gauss.

3. In a coating device according to claim 2, wherein the magnetic intensity of the smoothing plate is in the range of 100 to 2000 gauss.

4. In a coating device according to claim 1, wherein the means for mounting the magnet is an adjustable mounting means to enable adjusting the distance between the magnet and the smoothing plate to change the magnetic intensity on the smoothing plate.

* * * * *